United States Patent
Kishishita et al.

(10) Patent No.: US 10,445,213 B2
(45) Date of Patent: Oct. 15, 2019

(54) NON-TRANSITORY COMPUTER-READABLE STORAGE MEDIUM, EVALUATION METHOD, AND EVALUATION DEVICE

(71) Applicant: FUJITSU LIMITED, Kawasaki-shi, Kanagawa (JP)

(72) Inventors: Naohiro Kishishita, Akashi (JP); Makoto Adachi, Akashi (JP); Hiroshi Iyobe, Yokohama (JP); Yosuke Naka, Kobe (JP); Takaaki Nakazawa, Nagoya (JP); Takeya Mutoh, Akashi (JP); Shunichi Obinata, Kawasaki (JP); Kazuki Yamada, Nada (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/635,662

(22) Filed: Jun. 28, 2017

(65) Prior Publication Data

US 2018/0004626 A1   Jan. 4, 2018

(30) Foreign Application Priority Data

Jul. 4, 2016 (JP) ................................. 2016-132895

(51) Int. Cl.
  *G06F 9/44* (2018.01)
  *G06F 9/45* (2006.01)
  (Continued)

(52) U.S. Cl.
  CPC ...... *G06F 11/3612* (2013.01); *G06F 11/0709* (2013.01); *G06F 11/0775* (2013.01); *H04L 41/0246* (2013.01); *G06F 11/0712* (2013.01)

(58) Field of Classification Search
  CPC ............. G06F 11/3612; G06F 11/0709; G06F 11/0775; G06F 11/0712; H04L 41/0246
  See application file for complete search history.

(56) References Cited

U.S. PATENT DOCUMENTS 7,461,135 B2 * 12/2008 Murayama ............ G06F 21/629
  709/217
8,769,069 B2 * 7/2014 Sakai .................. G06F 11/0709
  709/223

(Continued)

FOREIGN PATENT DOCUMENTS

JP  2005-115751 A  4/2005
JP  2010-86516 A   4/2009

(Continued)

OTHER PUBLICATIONS

Shou-Yu Lee, A QoS Assurance Middleware Model for Enterprise Cloud Computing, 2012, pp. 322-327. https://ieeexplore.ieee.org/stamp/stamp.jsp?arnumber=6341595 (Year: 2012).*

(Continued)

*Primary Examiner* — Mongbao Nguyen
(74) *Attorney, Agent, or Firm* — Westerman, Hattori, Daniels & Adrian

(57) ABSTRACT

A non-transitory computer-readable storage medium storing an evaluation program that causes a computer to execute a process, the process including receiving designation of a software, obtaining an execution condition used for an execution request for the designated software based on information stored in a memory, the execution request having been issued by the specified software, the information associating the designated software with the execution condition, executing the execution request for the designated software, by using the acquired execution condition, acquiring log information regarding an execution of the designated software when the designated software is executed in response to the execution request, performing an evaluation related to the specified software, based on the acquired log information, and outputting an evaluation result.

4 Claims, 19 Drawing Sheets

(51) Int. Cl.
  *G06F 9/445* (2018.01)
  *G06F 11/36* (2006.01)
  *H04L 12/24* (2006.01)
  *G06F 11/07* (2006.01)

(56) References Cited

U.S. PATENT DOCUMENTS

| | | | | |
|---|---|---|---|---|
| 8,839,210 | B2* | 9/2014 | Kamigata | G06F 11/3612 714/47.1 |
| 8,949,996 | B2* | 2/2015 | Kalman | G06F 11/3684 709/203 |
| 9,213,832 | B2* | 12/2015 | Amit | H04L 63/166 |
| 9,342,426 | B2* | 5/2016 | Okada | G06F 11/2736 |
| 9,513,957 | B2* | 12/2016 | Ozaki | G06F 11/0709 |
| 9,965,379 | B1* | 5/2018 | Hariharan | G06F 11/3684 |
| 2005/0081122 | A1 | 4/2005 | Hiramatsu et al. | |
| 2006/0101399 | A1* | 5/2006 | Murayama | G06F 21/629 717/120 |
| 2009/0228871 | A1* | 9/2009 | Edwards | G06F 11/3676 717/128 |
| 2010/0058108 | A1* | 3/2010 | Nammatsu | G06F 11/0709 714/4.1 |
| 2011/0004885 | A1* | 1/2011 | Kikuchi | H04L 41/147 718/104 |
| 2011/0270963 | A1* | 11/2011 | Saito | G06F 21/105 709/224 |
| 2012/0096455 | A1* | 4/2012 | Katsumata | G06F 8/61 717/177 |
| 2013/0031533 | A1* | 1/2013 | Machida | G06F 11/3692 717/127 |
| 2013/0055216 | A1* | 2/2013 | Soejima | G06F 11/3672 717/128 |
| 2014/0006844 | A1* | 1/2014 | Alderman | G06F 11/0793 714/4.1 |
| 2014/0089736 | A1* | 3/2014 | Okada | G06F 11/2736 714/31 |
| 2014/0109063 | A1* | 4/2014 | Schissel | G06F 11/368 717/127 |
| 2015/0128156 | A1* | 5/2015 | Zhu | G06F 8/74 719/328 |
| 2015/0150131 | A1 | 5/2015 | Boutnaru et al. | |
| 2015/0286556 | A1* | 10/2015 | Ellis | G06F 11/3684 717/125 |
| 2015/0355935 | A1* | 12/2015 | Ozaki | G06F 11/0709 718/100 |
| 2016/0188898 | A1* | 6/2016 | Karinta | G06F 16/172 726/4 |
| 2016/0299790 | A1* | 10/2016 | Wagner | G06F 9/5072 |
| 2017/0060560 | A1* | 3/2017 | Kumar | G06F 8/65 |
| 2017/0099292 | A1* | 4/2017 | Kelley | H04L 63/10 |
| 2017/0123941 | A1* | 5/2017 | Yubamoto | G06F 9/50 |

FOREIGN PATENT DOCUMENTS

| | | |
|---|---|---|
| JP | 2016-507155 A | 3/2016 |
| WO | 2013/171944 A1 | 11/2013 |

OTHER PUBLICATIONS

Weiyi Shang, An Exploratory Study of the Evolution of Communicated Information about the Execution of Large Software Systems, 2011, pp. 335-344. https://ieeexplore.ieee.org/stamp/stamp.jsp?tp=&arnumber=6079859 (Year: 2011).*

Masahiro Yoshizawa, Integrated Monitoring Software for Application Service Managers, 2014, pp. 321-332. https://ieeexplore.ieee.org/stamp/stamp.jsp?tp=&arnumber=6873567 (Year: 2014).*

M.Gomathy, Developing an Error Logging Framework for Ruby on Rails Application using AOP, 2014, pp. 44-49. https://ieeexplore.ieee.org/stamp/stamp.jsp?tp=&arnumber=6755103 (Year: 2014).*

Masahiro Tanaka, Web API Creation for Enterprise Mashup, 2011, pp. 319-326. https://ieeexplore.ieee.org/stamp/stamp.jsp?tp=&arnumber=6012691 (Year 2011).*

* cited by examiner

FIG. 2

| SERVICE IDENTIFICATION INFORMATION | API METHOD | PARAMETER 1 | | | PARAMETER 2 | | |
|---|---|---|---|---|---|---|---|
| | | NAME | VALUE | TYPE | NAME | VALUE | TYPE |
| SERVICE 210a | PUT /aaa/xxx | mode | modeA | FIXED CHARACTER STRING | name | nameA | ARBITRARY CHARACTER STRING |
| | PUT /aaa/xxx | mode | modeB | FIXED CHARACTER STRING | name | NAME_B | ARBITRARY CHARACTER STRING |
| | GET /aaa/yyy | type | 1 | NUMERICAL VALUE | - | - | - |
| | GET /aaa/yyy | type | 0 | NUMERICAL VALUE | - | - | - |

| SERVICE IDENTIFICATION INFORMATION | API METHOD | PARAMETER 1 | | PARAMETER 2 | | LOG PATTERN |
|---|---|---|---|---|---|---|
| | | NAME | VALUE | NAME | VALUE | |
| SERVICE 210a | PUT /aaa/xxx | mode | modeA | name | nameA | HTTP Status = 200<br>Response body: aaabbbcccdddeee<br>Response time: 0.3s |

FIG. 4

```
[2016/3/15 18:00:00.100] Start benchmark
[2016/3/15 18:00:00.200] [REST API: PUT https://xxx.com/aaa/xxx?mode=modeA&name=nameA]
[2016/3/15 18:00:00.500] HTTP Status = 200
[2016/3/15 18:00:00.500] Response body: aaabbbcccdddeee
[2016/3/15 18:00:00.500] Response time: 0.3s
[2016/3/15 18:00:00.500] [REST API: PUT https://xxx.com/aaa/xxx?mode=modeA&name=nameA]
[2016/3/15 18:00:00.900] HTTP Status = 200
[2016/3/15 18:00:00.900] Response body: dddeeefffggglll
[2016/3/15 18:00:00.900] Response time: 0.4s
: :
[2016/3/15 18:05:00.000] End benchmark
```

FIG. 5

| TRANSMISSION SOURCE IDENTIFICATION INFORMATION | TIME | SERVICE IDENTIFIER INFORMATION | API METHOD | PARAMETER 1 | | | PARAMETER 2 | | |
|---|---|---|---|---|---|---|---|---|---|
| | | | | NAME | VALUE | TYPE | NAME | VALUE | TYPE |
| BENCH MARK 160 | 2016/1/1 0:00 | SERVICE 210a | PUT /aaa/xxx | mode | modeA | FIXED CHARACTER STRING | name | nameA | ARBITRARY CHARACTER STRING |

FIG. 6

| TIME | SERVICE IDENTIFIER INFORMATION | API METHOD | PARAMETER 1 | | | PARAMETER 2 | | | |
|---|---|---|---|---|---|---|---|---|---|
| | | | NAME | VALUE | TYPE | NAME | VALUE | TYPE | |
| 2016/1/1 0:00 | SERVICE 210a | PUT /aaa/xxx | mode | modeA | FIXED CHARACTER STRING | name | nameA | ARBITRARY CHARACTER STRING | |
| 2016/1/15 1:00 | SERVICE 210a | PUT /aaa/xxx | mode | modeB | FIXED CHARACTER STRING | name | NAME_B | ARBITRARY CHARACTER STRING | |
| 2016/1/30 1:05 | SERVICE 210a | PUT /aaa/xxx | mode | modeA | FIXED CHARACTER STRING | name | NAME_C | ARBITRARY CHARACTER STRING | |
| 2016/2/1 1:10 | SERVICE 210a | PUT /aaa/xxx | mode | modeA | FIXED CHARACTER STRING | name | nameD | ARBITRARY CHARACTER STRING | |
| 2016/2/10 10:05 | SERVICE 210a | GET /aaa/yyy | type | 1 | NUMERICAL VALUE | — | — | — | |
| 2016/2/20 1:10 | SERVICE 210a | GET /aaa/yyy | type | 0 | NUMERICAL VALUE | — | — | — | |
| 2016/1/2 5:10 | SERVICE 210b | GET /bbb/xxx | search_name | testA | ARBITRARY CHARACTER STRING | limit | 10 | NUMERICAL VALUE | |
| 2016/1/3 5:11 | SERVICE 210b | GET /bbb/xxx | search_name | testX | ARBITRARY CHARACTER STRING | limit | 15 | NUMERICAL VALUE | |
| 2016/2/3 10:10 | SERVICE 210b | GET /bbb/xxx | search_name | TEST_B | ARBITRARY CHARACTER STRING | limit | 100 | NUMERICAL VALUE | |
| 2016/2/10 11:11 | SERVICE 210b | GET /bbb/xxx | search_name | ABCDEFG | ARBITRARY CHARACTER STRING | limit | 500 | NUMERICAL VALUE | |

| SERVICE IDENTIFIER INFORMATION | API METHOD | PARAMETER 1 | | PARAMETER 2 | | LOG PATTERN |
|---|---|---|---|---|---|---|
| | | NAME | VALUE | NAME | VALUE | |
| SERVICE 210a | PUT /aaa/xxx | mode | modeA | name | nameA | HTTP Status = 200<br>Response body: aaabbbcccdddeee<br>Response time: 0.3s |
| SERVICE 210a | PUT /aaa/xxx | mode | modeB | name | NAME_B | HTTP Status = 200<br>Response body: dddeeefffgggiii<br>Response time: 0.4s |
| SERVICE 210a | GET /aaa/yyy | type | 1 | - | - | HTTP Status = 200<br>Response body: listA<br>Response time: 0.1s |
| SERVICE 210a | GET /aaa/yyy | type | 0 | - | - | HTTP Status = 200<br>Response body: listB<br>Response time: 0.9s |
| SERVICE 210b | GET /bbb/xxx | search_name | testA | limit | 10 | HTTP Status = 200<br>Response body: result1<br>Response time: 0.1s |
| SERVICE 210b | GET /bbb/xxx | search_name | TEST_B | limit | 100 | HTTP Status = 200<br>Response body: resultABCDE<br>Response time: 0.5s |
| SERVICE 210b | GET /bbb/xxx | search_name | ABCDEFG | limit | 500 | HTTP Status = 200<br>Response body: resultXYZ<br>Response time: 1.0s |

| SERVICE IDENTIFIER INFORMATION | API METHOD | PARAMETER 1 | | | PARAMETER 2 | | |
|---|---|---|---|---|---|---|---|
| | | NAME | VALUE | TYPE | NAME | VALUE | TYPE |
| SERVICE 210b | GET /bbb/xxx | search_name | testA | ARBITRARY CHARACTER STRING | limit | 10 | NUMERICAL VALUE |
| | GET /bbb/xxx | search_name | TEST_B | ARBITRARY CHARACTER STRING | limit | 100 | NUMERICAL VALUE |
| | GET /bbb/xxx | search_name | ABCDEFG | ARBITRARY CHARACTER STRING | limit | 500 | NUMERICAL VALUE |

⇩

150d

| SERVICE IDENTIFIER INFORMATION | API METHOD | PARAMETER 1 | | | PARAMETER 2 | | |
|---|---|---|---|---|---|---|---|
| | | NAME | VALUE | TYPE | NAME | VALUE | TYPE |
| SERVICE 210b | GET /bbb/xxx | search_name | testA | ARBITRARY CHARACTER STRING | limit | 10 | NUMERICAL VALUE |
| | GET /bbb/xxx | search_name | TEST_B | ARBITRARY CHARACTER STRING | limit | 100 | NUMERICAL VALUE |
| | GET /bbb/xxx | search_name | ABCDEFG | ARBITRARY CHARACTER STRING | limit | 500 | NUMERICAL VALUE |
| | POST /bbb/xxx | user | USER_A | ARBITRARY CHARACTER STRING | limit | 510 | NUMERICAL VALUE |

⇩

150e

| SERVICE IDENTIFIER INFORMATION | API METHOD | PARAMETER 1 | | | PARAMETER 2 | | |
|---|---|---|---|---|---|---|---|
| | | NAME | VALUE | TYPE | NAME | VALUE | TYPE |
| SERVICE 210b | GET /bbb/xxx | search_name | testA | ARBITRARY CHARACTER STRING | limit | 10 | NUMERICAL VALUE |
| | GET /bbb/xxx | search_name | TEST_B | ARBITRARY CHARACTER STRING | limit | 100 | NUMERICAL VALUE |
| | GET /bbb/xxx | search_name | ABCDEFG | ARBITRARY CHARACTER STRING | limit | 500 | NUMERICAL VALUE |
| | POST /bbb/xxx | - | - | ARBITRARY CHARACTER STRING | - | - | - |

| TIME | SERVICE IDENTIFIER INFORMATION | API METHOD | PARAMETER 1 | | | PARAMETER 2 | | |
|---|---|---|---|---|---|---|---|---|
| | | | NAME | VALUE | TYPE | NAME | VALUE | TYPE |
| 2016/1/1 0:00 | SERVICE 210a | PUT /aaa/xxx | mode | modeA | FIXED CHARACTER STRING | name | nameA | ARBITRARY CHARACTER STRING |
| 2016/1/15 1:00 | SERVICE 210a | PUT /aaa/xxx | mode | modeB | FIXED CHARACTER STRING | name | NAME_B | ARBITRARY CHARACTER STRING |
| 2016/1/30 1:05 | SERVICE 210a | PUT /aaa/xxx | mode | modeA | FIXED CHARACTER STRING | name | NAME_C | ARBITRARY CHARACTER STRING |
| 2016/2/1 1:10 | SERVICE 210a | PUT /aaa/xxx | mode | modeA | FIXED CHARACTER STRING | name | nameD | ARBITRARY CHARACTER STRING |
| 2016/2/10 10:05 | SERVICE 210a | GET /aaa/yyy | type | 1 | NUMERICAL VALUE | - | - | - |
| 2016/2/20 1:10 | SERVICE 210a | GET /aaa/yyy | type | 0 | NUMERICAL VALUE | - | - | - |
| 2016/1/2 5:10 | SERVICE 210b | GET /bbb/xxx | search_name | testA | ARBITRARY CHARACTER STRING | limit | 10 | NUMERICAL VALUE |
| 2016/1/3 5:11 | SERVICE 210b | GET /bbb/xxx | search_name | testX | ARBITRARY CHARACTER STRING | limit | 15 | NUMERICAL VALUE |
| 2016/2/3 10:10 | SERVICE 210b | GET /bbb/xxx | search_name | TEST_B | ARBITRARY CHARACTER STRING | limit | 100 | NUMERICAL VALUE |
| 2016/2/10 11:11 | SERVICE 210b | GET /bbb/xxx | search_name | ABCDEFG | ARBITRARY CHARACTER STRING | limit | 500 | NUMERICAL VALUE |

⇩

250b

| TIME | SERVICE IDENTIFIER INFORMATION | API METHOD | PARAMETER 1 | | | PARAMETER 2 | | |
|---|---|---|---|---|---|---|---|---|
| | | | NAME | VALUE | TYPE | NAME | VALUE | TYPE |
| 2016/1/1 0:00 | SERVICE 210a | PUT /aaa/xxx | mode | modeA | FIXED CHARACTER STRING | name | nameA | ARBITRARY CHARACTER STRING |
| 2016/3/15 14:00 | SERVICE 210a | PUT /aaa/xxx | mode | modeB | FIXED CHARACTER STRING | name | NAME_B | ARBITRARY CHARACTER STRING |
| 2016/1/30 1:05 | SERVICE 210a | PUT /aaa/xxx | mode | modeA | FIXED CHARACTER STRING | name | NAME_C | ARBITRARY CHARACTER STRING |
| 2016/2/1 1:10 | SERVICE 210a | PUT /aaa/xxx | mode | modeA | FIXED CHARACTER STRING | name | nameD | ARBITRARY CHARACTER STRING |
| 2016/3/15 15:00 | SERVICE 210a | PUT /aaa/xxx | mode | modeC | FIXED CHARACTER STRING | name | nameE | ARBITRARY CHARACTER STRING |
| 2016/2/10 10:05 | SERVICE 210a | GET /aaa/yyy | type | 1 | NUMERICAL VALUE | - | - | - |
| 2016/2/20 1:10 | SERVICE 210a | GET /aaa/yyy | type | 0 | NUMERICAL VALUE | - | - | - |
| 2016/1/2 5:10 | SERVICE 210b | GET /bbb/xxx | search_name | testA | ARBITRARY CHARACTER STRING | limit | 10 | NUMERICAL VALUE |
| 2016/1/3 5:11 | SERVICE 210b | GET /bbb/xxx | search_name | testX | ARBITRARY CHARACTER STRING | limit | 15 | NUMERICAL VALUE |
| 2016/2/3 10:10 | SERVICE 210b | GET /bbb/xxx | search_name | TEST_B | ARBITRARY CHARACTER STRING | limit | 100 | NUMERICAL VALUE |
| 2016/2/10 11:11 | SERVICE 210b | GET /bbb/xxx | search_name | ABCDEFG | ARBITRARY CHARACTER STRING | limit | 500 | NUMERICAL VALUE |
| 2016/3/15 16:00 | SERVICE 210b | GET /bbb/xxx | search_name | 12345 | ARBITRARY CHARACTER STRING | limit | 510 | NUMERICAL VALUE |
| 2016/3/15 16:30 | SERVICE 210b | POST /bbb/xxx | user | USER_A | ARBITRARY CHARACTER STRING | - | - | - |

FIG. 13

| TIME | SERVICE IDENTIFIER INFORMATION | API METHOD | PARAMETER 1 | | | PARAMETER 2 | | |
|---|---|---|---|---|---|---|---|---|
| | | | NAME | VALUE | TYPE | NAME | VALUE | TYPE |
| 2016/3/15 14:00 | SERVICE 210a | PUT /aaa/xxx | mode | modeB | FIXED CHARACTER STRING | name | NAME_B | ARBITRARY CHARACTER STRING ~(1) |
| 2016/3/15 15:00 | SERVICE 210a | PUT /aaa/xxx | mode | modeC | FIXED CHARACTER STRING | name | nameE | ARBITRARY CHARACTER STRING ~(2) |
| 2016/3/15 16:00 | SERVICE 210b | GET /bbb/xxx | search_name | 12345 | ARBITRARY CHARACTER STRING | limit | 510 | NUMERICAL VALUE ~(3) |
| 2016/3/15 16:30 | SERVICE 210b | POST /bbb/xxx | user | USER_A | ARBITRARY CHARACTER STRING | - | - | - ~(4) |

NON-TRANSITORY COMPUTER-READABLE STORAGE MEDIUM, EVALUATION METHOD, AND EVALUATION DEVICE

CROSS-REFERENCE TO RELATED APPLICATION

This application is based upon and claims the benefit of priority of the prior Japanese Patent Application No. 2016-132895, filed on Jul. 4, 2016, the entire contents of which are incorporated herein by reference.

FIELD

The embodiments discussed herein are related to a non-transitory computer-readable storage medium, an evaluation method, and an evaluation device.

BACKGROUND

In a system in which pieces of software cooperate with one another, a piece of software is updated, thereby generating an abnormality in an operation of a piece of software serving as a cooperation destination, in some cases. Here, in a case of managing all the pieces of software of the system, a manager is able to freely analyze log information and performance information of each of the pieces of software. Therefore, it is possible to detect generation of an abnormality and to detect a cause of the generation of the abnormality.

Related technologies are disclosed in Japanese Laid-open Patent Publication No. 2005-115751, Japanese Laid-open Patent Publication No. 2010-086516, International Publication Pamphlet No. WO 2013171944, and Japanese National Publication of International Patent Application No. 2016-507115.

SUMMARY

According to an aspect of the invention, a non-transitory computer-readable storage medium storing an evaluation program that causes a computer to execute a process, the process including receiving designation of a software, obtaining an execution condition used for an execution request for the designated software based on information stored in a memory, the execution request having been issued by the specified software, the information associating the designated software with the execution condition, executing the execution request for the designated software, by using the acquired execution condition, acquiring log information regarding an execution of the designated software when the designated software is executed in response to the execution request, performing an evaluation related to the specified software, based on the acquired log information, and outputting an evaluation result.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of a data structure of a benchmark operation table;

FIG. 3 is a diagram illustrating an example of a data structure of first log information;

FIG. 4 is a diagram illustrating an example of a log pattern;

FIG. 5 is a diagram illustrating an example of a data structure of second log information;

FIG. 6 is a diagram illustrating an example of a data structure of an API call pattern table;

FIG. 7 is a diagram illustrating an example of a data structure of a log pattern table;

FIG. 10 is a diagram (part two) illustrating an example of the processing performed by the update unit;

FIG. 12 is a diagram for explaining an example of update processing performed by an API call pattern table update unit;

FIG. 13 is a diagram illustrating an example of the second log information;

DESCRIPTION OF EMBODIMENTS

However, in the above-mentioned related technologies, there is a problem that it is difficult to detect an abnormality in an operation of a specific piece of software.

In recent years, in a public cloud, a layer thereof is divided into layers such as an infrastructure as a service (IaaS) layer, a platform as a service (PaaS) layer, and a software as a service (SaaS) layer, and a developer or a manager varies from one layer to another. In addition, from a compliance standpoint, it is difficult for a manager of one of the layers to collect and analyze, without permission, log information or performance information, managed by a manager of another one of the layers. Therefore, it is difficult for a manager of one of the layers to detect generation of an abnormality in an operation of a piece of software, the abnormality being generated in another one of the layers, and to detect a cause of the generation of the abnormality.

In one aspect, an object of the present technology is to provide an evaluation program, an evaluation method, an evaluation device, and an information processing device that are each capable of detecting an abnormality in an operation of a specific piece of software.

Hereinafter, embodiments of an evaluation program, an evaluation method, an evaluation device, and an information processing device, disclosed by the present application, will be described in detail, based on drawings. Note that the embodiments do not limit the present technology.

Figure 1:
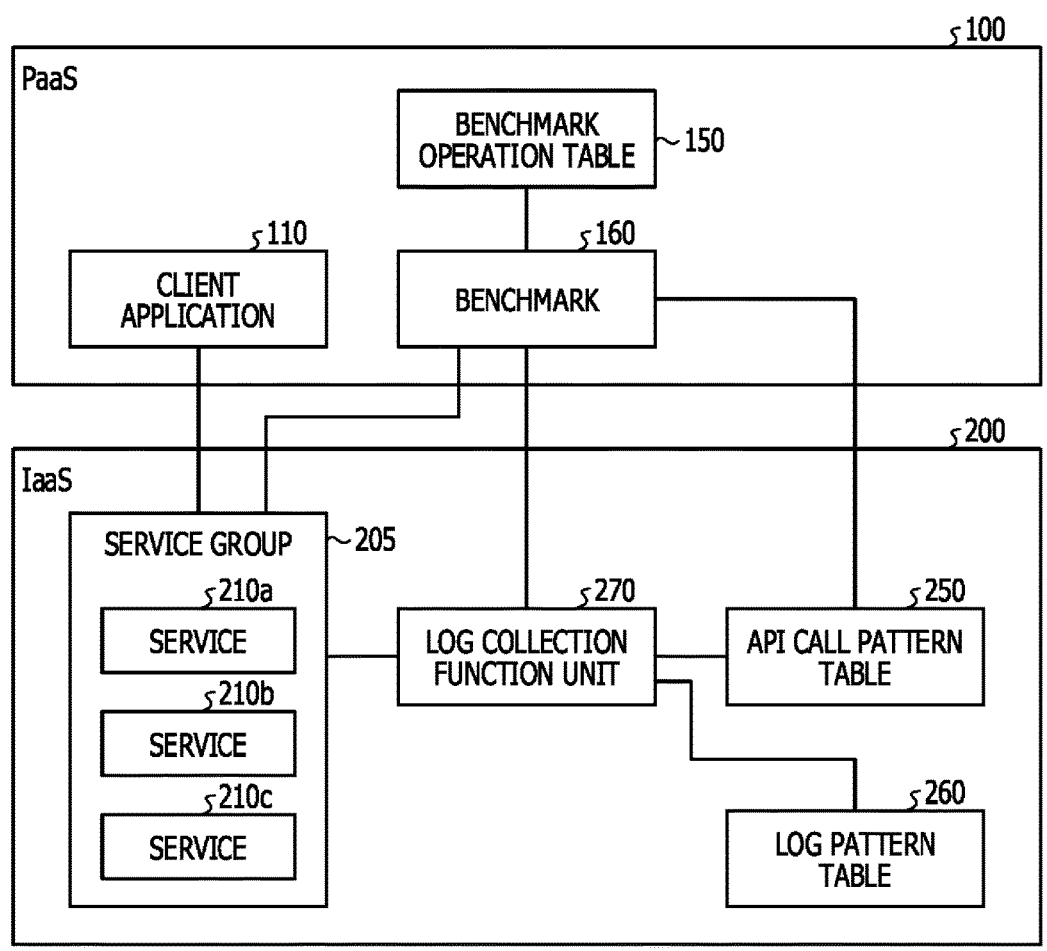
FIG. 1 is a diagram illustrating a configuration of a system according to the present embodiment.

FIG. 1 is a diagram illustrating a configuration of a system according to the present embodiment. As illustrated in FIG. 1, this system includes a platform as a service (PaaS) 100 and an infrastructure as a service (IaaS) 200.

The PaaS 100 provides, as services on the Internet, a set of platforms such as hardware and an operating system (OS), used by various kinds of software to operate. The PaaS 100 includes client application 110, a benchmark operation table 150, and a benchmark 160, for example. While, here, only the client application 110 and the benchmark 160 are illustrated, the PaaS 100 may include another piece of client application and another benchmark.

The IaaS 200 provides, as services on the Internet, equipment such as a virtual server and an infrastructure such as a network. The IaaS 200 includes a service group 205, an API call pattern table 250, a log pattern table 260, and a log collection function unit 270, for example.

The client application 110 is software (an application program) installed by a client. By using an application program interface (API) request, the client application 110 calls a service included in the service group 205, thereby causing the called service to execute processing. The API request includes an API method and a parameter, for example. The API method includes information for identifying a service to serve as a call target, for example. The parameter corresponds to a condition in a case where the service executes the processing. Note that, from a compliance standpoint, it is difficult to freely analyze log information or performance information directly from the client application 110.

The benchmark operation table 150 is a table in which an API method and a parameter, output to a service by a specific piece of software, are held while being associated with each other. The specific piece of software corresponds to the client application 110 or the benchmark 160, for example.

FIG. 2 is a diagram illustrating an example of a data structure of a benchmark operation table. As illustrated in FIG. 2, this benchmark operation table 150 associates service identification information, an API method, a parameter 1, and a parameter 2 with one another. The service identification information is information for uniquely identifying a service to which the API request is transmitted. The API method indicates an API method used in a case where a specific piece of software of the PaaS 100 calls a service of the IaaS 200. The parameters 1 and 2 are execution conditions specified for the service called by the API method. The parameters 1 and 2 each include a name, a value, and a type, for example.

Based on the benchmark operation table 150, the benchmark 160 generates an API request. By using the generated API request, the benchmark 160 calls a service included in the service group 205, thereby causing the called service to execute processing.

The benchmark 160 generates first log information including the API request, a content of a response from the called service, a communication time, and so forth. The benchmark 160 outputs the generated first log information to the log collection function unit 270.

FIG. 3 is a diagram illustrating an example of a data structure of the first log information. As illustrated in FIG. 3, this first log information associates the service identification information, the API method, the parameters 1 and 2, and a log pattern with one another. The service identification information is information for uniquely identifying a service to which the benchmark 160 transmits the API request. The API method and the parameters 1 and 2 correspond to the API request output to the service by the benchmark 160. The log pattern includes log information of exchanges that are caused by transmission of the API request to one of services 210, performed by the benchmark 160, and that are performed between the corresponding one of the services 210 and the benchmark 160. An example of the log pattern will be described.

FIG. 4 is a diagram illustrating an example of a log pattern. As illustrated in FIG. 4, the log pattern associates a time and the log information of exchanges performed between the corresponding one of the services 210 and the benchmark 160 with each other.

The benchmark 160 references the API call pattern table 250, thereby updating the benchmark operation table 150. The benchmark 160 registers, in the benchmark operation table 150, a set of an API method and parameters that do not exist in the API call pattern table 250, thereby updating the benchmark operation table 150, for example.

The service group 205 includes services 210*a*, 210*b*, and 210*c*. The services 210*a* to 210*c* are collectively called the services 210 in an appropriate fashion. In a case of receiving an API request from the client application 110 or the benchmark 160, one of the services 210 executes processing, based on an API method and parameters included in the API request. Based on an execution result, the corresponding one of the services 210 generates second log information, for example.

FIG. 5 is a diagram illustrating an example of a data structure of the second log information. As illustrated in FIG. 5, the second log information includes transmission source identification information, a time, service identification information, an API method, and parameters 1 and 2. The transmission source identification information is information for uniquely identifying a transmission source of an API request, for example. In the present embodiment, the transmission source identification information corresponds to the client application 110 or the benchmark 160. The time is a time at which a corresponding one of the services 210 executes processing. The service identification information is information for uniquely identifying a service that executed the processing. The API method and the parameters 1 and 2 correspond to the API request output to a service by the benchmark 160.

The API call pattern table 250 stores therein pieces of second log information in each of which the transmission source identification information corresponds to the benchmark 160 and which are included in the second log information. FIG. 6 is a diagram illustrating an example of a data structure of an API call pattern table. As illustrated in FIG. 6, the API call pattern table 250 includes a time, service identification information, an API method, and parameters 1 and 2. Explanations of the time, the service identification information, the API method, and the parameters 1 and 2 are the same as those in the FIG. 5.

A log pattern table 260 is information generated based on the first log information. FIG. 7 is a diagram illustrating an example of a data structure of a log pattern table. As illustrated in FIG. 7, the log pattern table 260 associates the service identification information, the API method, the parameters 1 and 2, and the log pattern with one another. Explanations of the service identification information, the API method, the parameters 1 and 2, and the log pattern are the same as those in the FIG. 3.

The log collection function unit 270 is a processing unit that collects the first log information from the benchmark 160 and that collects the second log information from the services 210 in the service group 205. Based on the first log information, the log collection function unit 270 generates the log pattern table 260. Based on the second log information, the log collection function unit 270 generates the API call pattern table 250.

The log collection function unit 270 analyzes the log pattern table 260 and performs an evaluation of the benchmark 160, thereby outputting an evaluation result.

Figure 8:
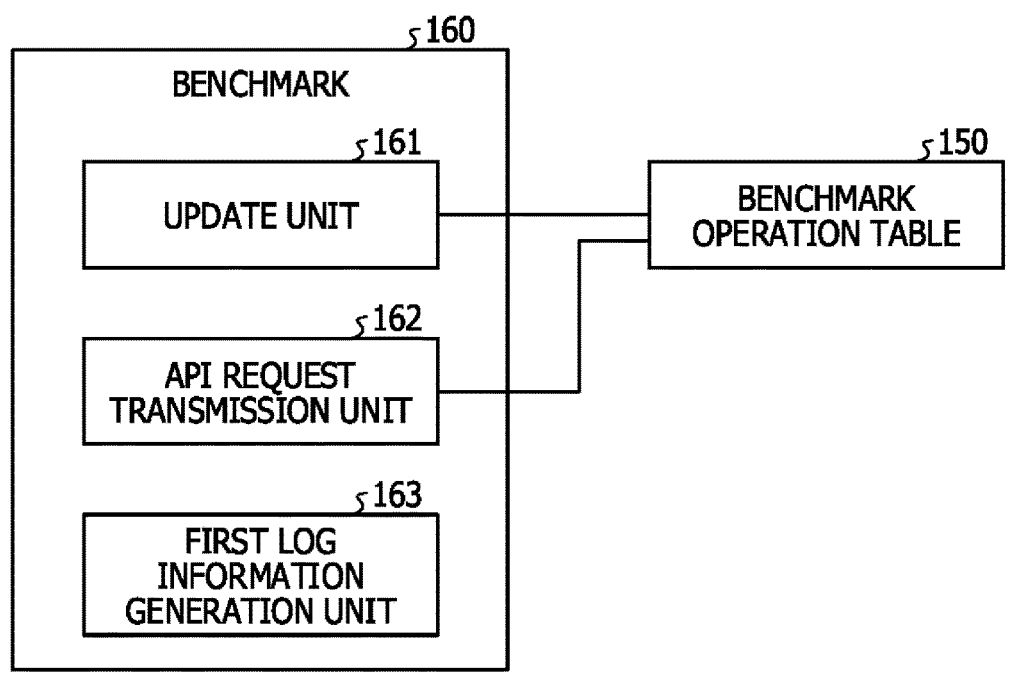
FIG. 8 is a functional block diagram illustrating a configuration of a benchmark.

Next, an example of a configuration of the benchmark 160 illustrated in FIG. 1 will be described. FIG. 8 is a functional block diagram illustrating a configuration of a benchmark. As illustrated in FIG. 8, this benchmark 160 includes an update unit 161, an API request transmission unit 162, and a first log information generation unit 163.

Figure 9:
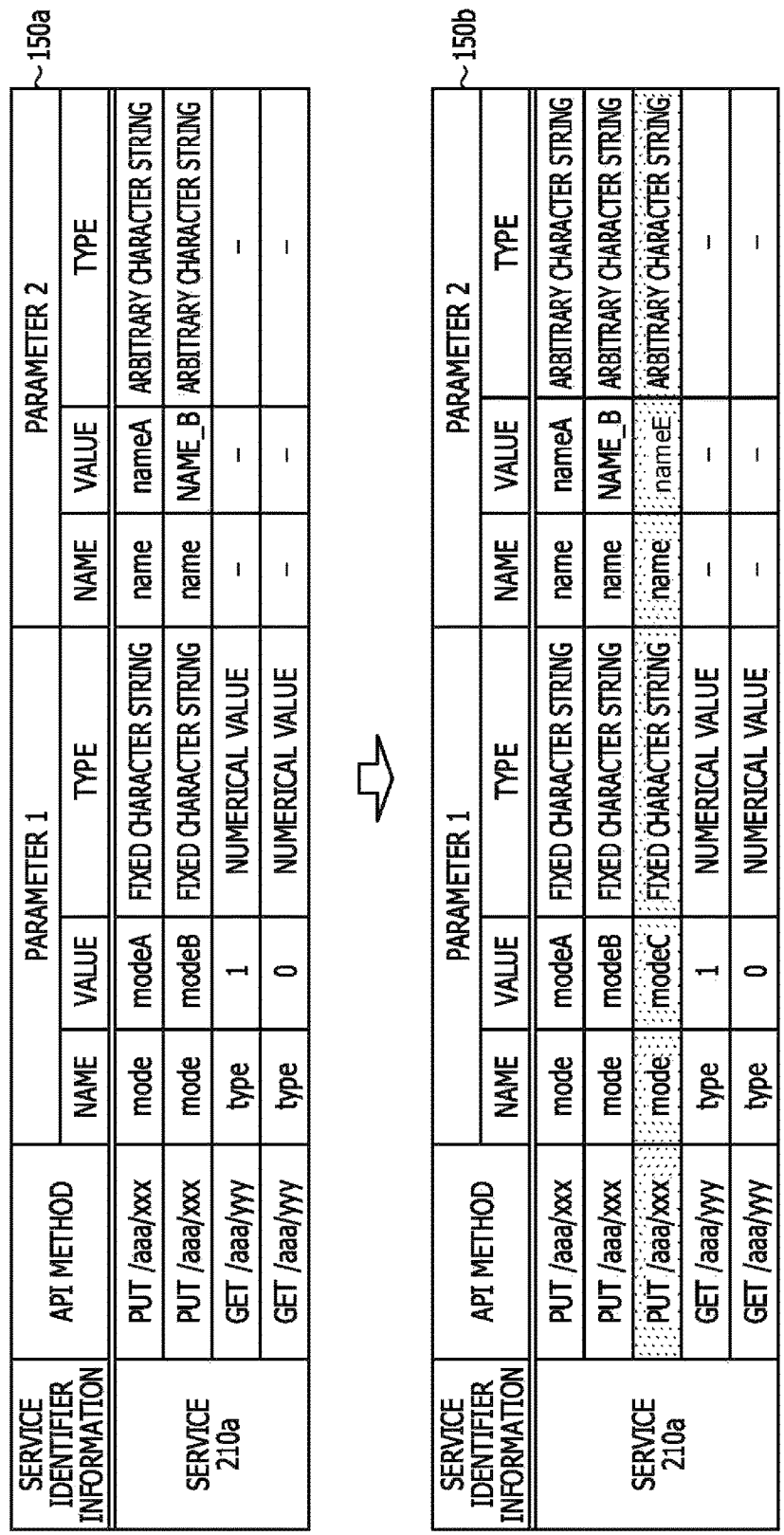
FIG. 9 is a diagram (part one) illustrating an example of processing performed by an update unit.

The update unit 161 is a processing unit that references the API call pattern table 250, thereby updating the benchmark operation table 150. FIG. 9 and FIG. 10 are diagram each illustrating an example of processing performed by an update unit. FIG. 9 will be described. FIG. 9 illustrates a benchmark operation table 150a before being updated and a benchmark operation table 150b after being updated. Note that it is assumed that the benchmark operation table 150a is a benchmark operation table corresponding to the service 210a.

It is assumed that, by referencing the API call pattern table 250, the update unit 161 detects an API request not existing in the benchmark operation table 150a, regarding API requests transmitted to the service 210a, for example. It is assumed that the relevant API request includes an API method of "PUT/aaa/xxx", the parameter 1 including "a name of "mode", a value of "modeC", and a type of "fixed character string"", the parameter 2 including "a name of "name", a value of "nameE", and a type of "arbitrary character string"", for example. In this case, in the benchmark operation table 150a, a corresponding record of the API request is registered, thereby generating the benchmark operation table 150b.

FIG. 10 will be described. FIG. 10 illustrates a benchmark operation table 150c before being updated and a benchmark operation table 150d after being updated. Note that it is assumed that benchmark operation table 150c is a benchmark operation table corresponding to the service 210b.

It is assumed that, by referencing the API call pattern table 250, the update unit 161 detects an API request not existing in the benchmark operation table 150c, regarding API requests transmitted to the service 210b, for example. It is assumed that the relevant API request includes an API method of "POST/bbb/xxx", the parameter 1 including "a name of "user", a value of "USERA", and a type of "arbitrary character string"", the parameter 2 including "a name of "limit", a value of "510", and a type of "numerical value"", for example. In this case, in the benchmark operation table 150c, a corresponding record of the API request is registered, thereby generating the benchmark operation table 150d.

Here, the update unit 161 selects registered records, for which the names and the types of parameters are coincident each other, and compares values of the selected records. In addition, in a case where a difference between the compared values is less than a threshold value, the update unit 161 deletes information of information of "name", "value", and "type" of a corresponding one of the parameters. In an example illustrated in FIG. 10, there is a coincidence of each of "names" and "types" between the parameter 2 of a record on a first line of the benchmark operation table 150d and the parameter 2 of a record on a fourth line thereof, and a difference in value is less than the threshold value, for example. In this case, the update unit 161 sets, to "-", the parameter 2 of the record on the fourth line, thereby generating the benchmark operation table 150e.

The API request transmission unit 162 is a processing unit that generates an API request and that transmits the generated API request to one of the services 210. The API request transmission unit 162 has a function of a first acquisition unit. The API request transmission unit 162 selects, from the benchmark operation table 150, a record not selected and stores, in an API request, the API method and the parameters 1 and 2 included in the selected record, thereby transmitting the API request to one of the services 210, for example. The service 210 to which the API request transmission unit 162 transmits may be preliminarily set by an administrator.

In addition, the API request transmission unit 162 may receive designation of the service 210 to serve as a transmission destination of the API request. In a case of receiving the designation of the service 210, the API request transmission unit 162 acquires the API method and the parameters 1 and 2 that correspond to the service, thereby generating the API request. In addition, the API request transmission unit 162 transmits the generated API request to the designated service 210.

In a case where there are multiple kinds of API methods and parameters 1 and 2 that correspond to the designated service 210, the API request transmission unit 162 generates API requests for the respective multiple kinds of API methods and parameters 1 and 2. The API request transmission unit 162 sequentially transmits the individual API requests to the designated service 210.

The first log information generation unit 163 is a processing unit that monitors exchanges of information between the service 210 serving as a transmission destination of an API request and the benchmark 160, thereby generating the first log information. The first log information generation unit 163 outputs the first log information to the log collection function unit 270.

A data structure of the first log information corresponds to that described in FIG. 3. The first log information generation unit 163 generates, as the first log information, pieces of information exchanged after the benchmark 160 transmits an API request and before processing corresponding to the API request finishes, for example. Every time an API request is transmitted to one of the services 210, the first log information generation unit 163 repeatedly performs the above-mentioned processing.

Figure 11:
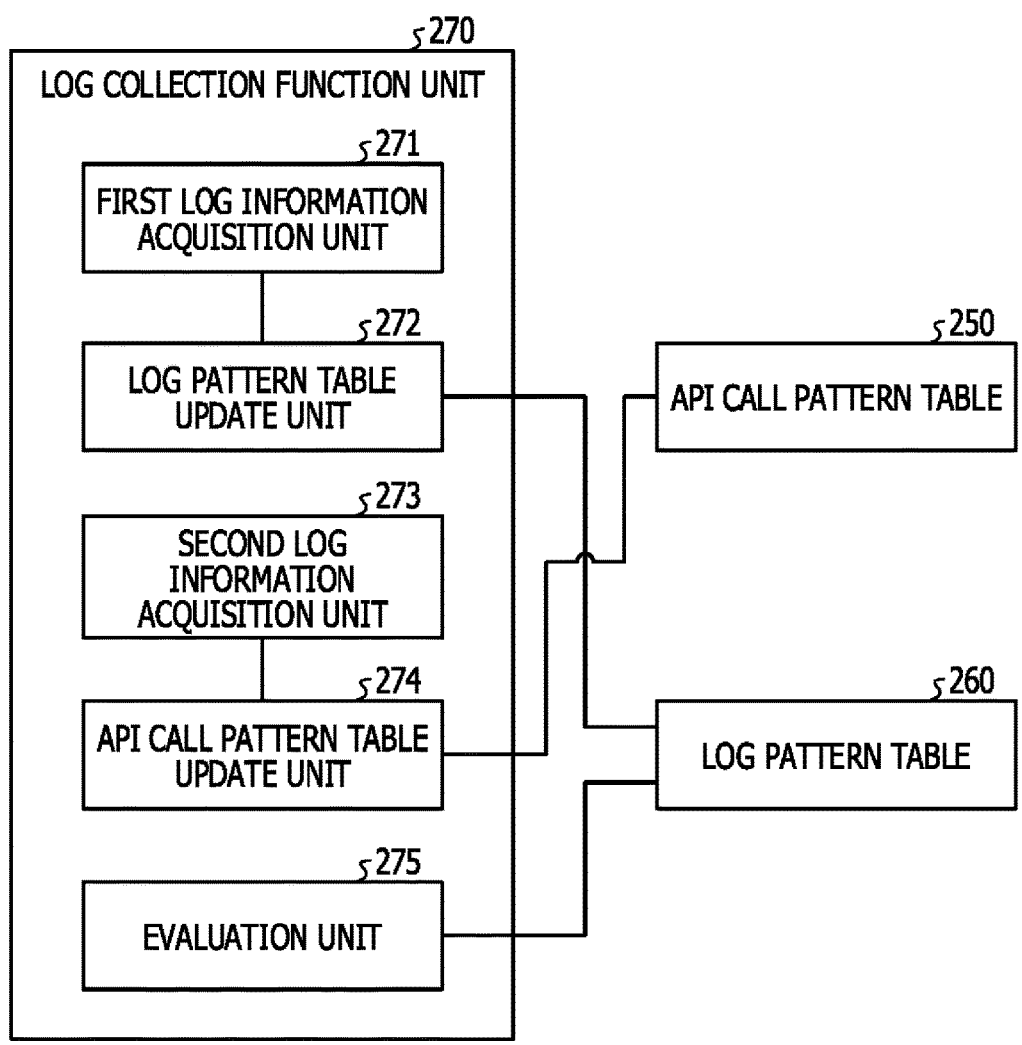
FIG. 11 is a functional block diagram illustrating a configuration of a log collection function unit.

Next, an example of a configuration of the log collection function unit 270 illustrated in FIG. 1 will be described. FIG. 11 is a functional block diagram illustrating a configuration of a log collection function unit. As illustrated in FIG. 11, this log collection function unit 270 includes a first log information acquisition unit 271, a log pattern table update unit 272, a second log information acquisition unit 273, an API call pattern table update unit 274, and an evaluation unit 275.

The first log information acquisition unit 271 is a processing unit that acquires the first log information from the benchmark 160. The first log information acquisition unit 271 has a function of a second acquisition unit. The first log information acquisition unit 271 outputs the acquired first log information to the log pattern table update unit 272.

The log pattern table update unit 272 is a processing unit that updates, based on the first log information, the log pattern table 260 in a case of acquiring the first log information. The log pattern table update unit 271 registers the first log information in the log pattern table 260, thereby updating the log pattern table 260, for example.

The second log information acquisition unit 273 is a processing unit that acquires the second log information from the services 210. The second log information acquisition unit 273 has a function of a log collection unit. The second log information acquisition unit 273 outputs the acquired second log information to the API call pattern table update unit 274.

The API call pattern table update unit 274 is a processing unit that updates the API call pattern table 250 in a case of acquiring the second log information. Hereinafter, an example of processing performed by the API call pattern table update unit 274 will be described.

The API call pattern table update unit 274 acquires the second log information, and in a case where the transmission source identification information included in the second log information is "benchmark 160", the API call pattern table update unit 274 does not perform after-mentioned update processing and waits until acquiring the subsequent second log information.

The API call pattern table update unit 274 acquires the second log information, and in a case where the transmission source identification information included in the second log information is "client application 110", the API call pattern table update unit 274 performs the after-mentioned update processing.

Update processing performed by the API call pattern table update unit 274 will be described. The API call pattern table update unit 274 compares the service identification information, the API method, and the parameters 1 and 2 included in the second log information with the API call pattern table 250, thereby determining whether or not there is a coincident record. In a case where there is a coincident record, the API call pattern table update unit 274 updates the time of the coincident record to the time of the second log information.

On the other hand, in a case where there is no coincident record, the API call pattern table update unit 274 newly registers the second log information in the API call pattern table 250.

FIG. 12 is a diagram for explaining an example of update processing performed by an API call pattern table update unit. FIG. 12 illustrates an API call pattern table 250*a* before being updated and an API call pattern table 250*b* after being updated, for example.

FIG. 13 is a diagram illustrating an example of the second log information. An example illustrated in FIG. 13 illustrates pieces of second log information (1) to (4).

The API call pattern table update unit 274 compares the API call pattern table 250*a* and the pieces of second log information (1) to (4) with each other. The service identification information, the API method, and the parameters 1 and 2 of the piece of second log information (1) are coincident with a record on a second line of the API call pattern table 250*a*. Therefore, the API call pattern table update unit 274 updates, to "Mar. 15, 2016, 14:00", a time on the second line of the API call pattern table 250*a* while associating the time on the second line of the API call pattern table 250*a* with the time of the piece of second log information (1).

In the API call pattern table 250*a*, there is no record corresponding to the piece of second log information (2). Therefore, the API call pattern table update unit 274 adds, to the API call pattern table 250*a*, a record corresponding to the piece of second log information (2). The added record corresponds to a record on a fifth line of the API call pattern table 250*b*, for example.

In the API call pattern table 250*a*, there are no records corresponding to the respective pieces of second log information (3) and (4). Therefore, the API call pattern table update unit 274 adds, to the API call pattern table 250*a*, records corresponding to the respective pieces of second log information (3) and (4). The added records correspond to records on respective twelfth and thirteenth lines of the API call pattern table 250*b*, for example.

Note that the API call pattern table update unit 274 periodically reference times of the API call pattern table 250 and identifies, based on a current time, times after a predetermined time period or more elapses. The API call pattern table update unit 274 acquires information of the current time, from a timer not illustrated. The API call pattern table update unit 274 deletes records corresponding to the identified times. The API call pattern table update unit 274 deletes records on a first, eighth, and ninth lines of the API call pattern table 250*b*, for example.

Furthermore, the API call pattern table update unit 274 references the API call pattern table 250, thereby updating, based on a content of "value" of each of parameters, "type" thereof. As for character strings specified by the values of parameters, there are a character string, selected from several patterns of fixed character strings and specified, and a character string specified as an arbitrary character string. In a case where a character string of a value is a character string selected from several patterns of fixed character strings and specified, a type is "fixed character string". In a case where a character string of a value is an arbitrary character string, a type is "arbitrary character string".

For each of values included in the API call pattern table 250, the API call pattern table update unit 274 counts the number of values corresponding to the same character string. In a case where the counted number of values is greater than or equal to a predetermined number, the API call pattern table update unit 274 sets types of relevant values to "fixed character string". On the other hand, in a case where the counted number of values is less than the predetermined number with respect to the number of samples, the API call pattern table update unit 274 sets types of relevant values to "arbitrary character string".

In a case where the number of values of "modeA" is greater than or equal to the predetermined number, the API call pattern table update unit 274 sets the types of values of "modeA" to "fixed character string", for example. In a case where the number of values of "testA" is less than the predetermined number, the API call pattern table update unit 274 sets the types of values of "testA" to "arbitrary character string".

The evaluation unit 275 is a processing unit that evaluates the benchmark 160, based on the log pattern table 260. The evaluation unit 275 references the log pattern table 260, and in a case where information informing of occurrence of an error is included in a log pattern, the evaluation unit 275 determines that an abnormality is likely to exist in the benchmark 160, and notifies a terminal device of a specified operator of error information, for example. At a point in time when the first log information acquisition unit 271 acquires the first log information, the evaluation unit 275 may determine whether or not the information informing of occurrence of an error is included in a log pattern of the first log information.

In addition, the evaluation unit 275 references the log pattern table 260 and identifies records the service identification information and the API method of each of which are coincident, thereby defining, as a reference record, one of the identified records. The evaluation unit 275 compares a log pattern of the reference record with each of log patterns of other records, thereby calculating a coincidence rate. Here, the other records are records coincident with the service identification information and the API method of the reference record.

In a case where the coincidence rate between the log pattern of the reference record and one of the log patterns of the other records is less than a threshold value, the evaluation unit 275 determinates that an abnormality is likely to exist in the benchmark 160, and notifies the terminal device of the specified operator of error information. In addition, the evaluation unit 275 identifies, as an abnormal record, one of the other records, which has a log pattern for which the coincidence rate with the log pattern of the reference record is less than the threshold value.

The evaluation unit 275 may select the reference record in any way. From among records the service identification information and the API method of each of which are coincident, the evaluation unit 275 selects, as the reference record, a record registered first in the log pattern table 260, for example.

Note that the evaluation unit 275 may perform the following processing, thereby calculating the coincidence rate. At a point in time when the first log information acquisition unit 271 acquires the first log information, the evaluation unit 275 identifies, from the log pattern table 260, records coincident with the service identification information and the API method of the first log information. The evaluation unit 275 compares a log pattern of the reference record selected from the identified records and the log pattern of the first log information, thereby calculating the coincidence rate.

Figure 14:
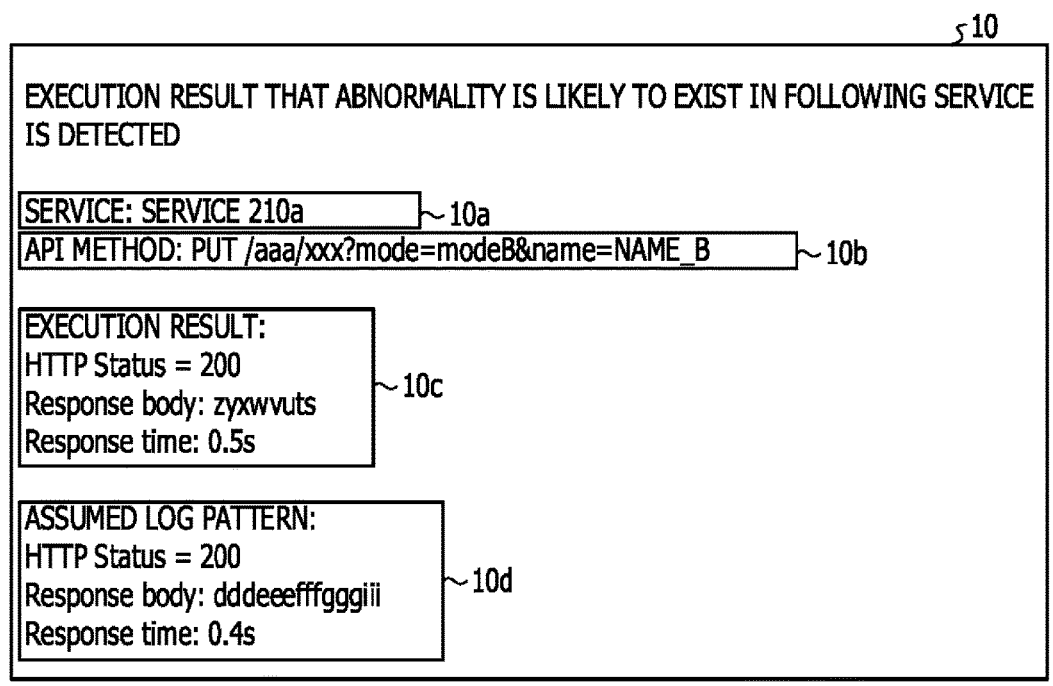
FIG. 14 is a diagram illustrating an example of error information of which a terminal device of an operator is notified.

FIG. 14 is a diagram illustrating an example of error information of which a terminal device of an operator is notified. As illustrated in FIG. 14, in error information 10, there are areas 10*a*, 10*b*, 10*c*, and 10*d*. The evaluation unit 275 registers, in the area 10*a*, service identification information included in an abnormal record. The evaluation unit 275 registers, in the area 10*b*, an API method included in the abnormal record.

The evaluation unit 275 registers, in the area 10*c*, a log pattern included in the abnormal record. The evaluation unit 275 registers, in the area 10*d*, the log pattern included in the reference record.

Every time a new record is registered in the log pattern table 260, the evaluation unit 275 repeatedly performs the above-mentioned processing.

Figure 15:
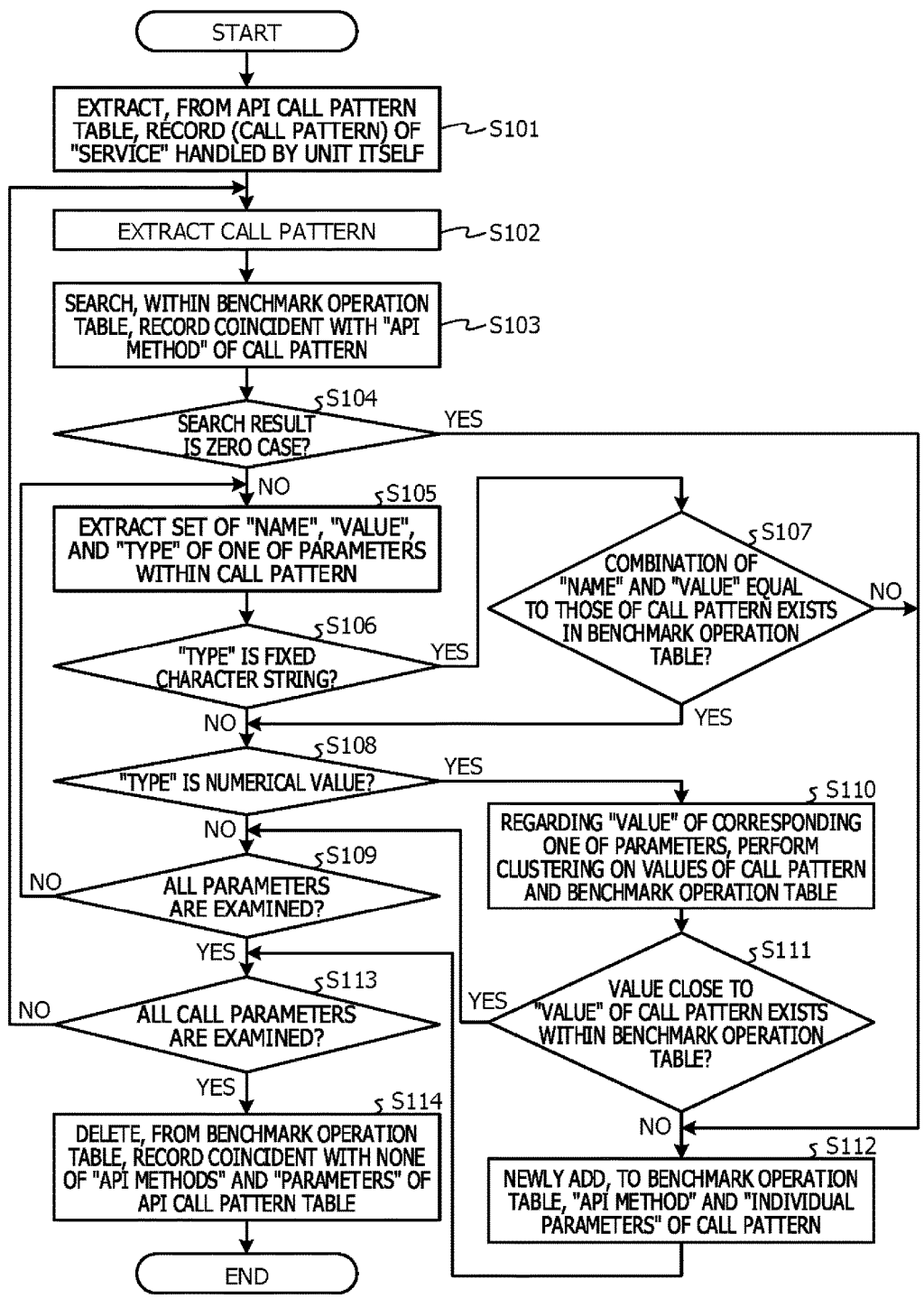
FIG. 15 is a flowchart illustrating a processing procedure by which the benchmark updates the benchmark operation table.

Next, a processing procedure by which the benchmark 160 updates the benchmark operation table 150 will be described. FIG. 15 is a flowchart illustrating a processing procedure by which the benchmark updates the benchmark operation table. As illustrated in FIG. 15, the update unit 161 in the benchmark 160 extracts, from the API call pattern table 250, a record of a service handled by the unit itself (the benchmark 160) (step S101). It is assumed that the service handled by the benchmark 160 is preliminarily set. In addition, in the following explanation, the record of the service handled by the unit itself is expressed as a call pattern.

The update unit 161 extracts a call pattern (step S102). The update unit 161 searches, within the benchmark operation table 150, a record coincident with "API method" of the call pattern (step S103).

The update unit 161 determines whether or not a search result is a zero case (step S104). In a case where the search result is a zero case (step S104: Yes), the update unit 161 makes a transition to step S112.

In a case where the search result is not a zero case (step S104: No), the update unit 161 extracts a set of "name", "value", and "type" of one of parameters within the call pattern (step S105).

The update unit 161 determines whether or not "type" is a fixed character string (step S106). In a case where "type" is a fixed character string (step S106: Yes), the update unit 161 makes a transition to step S107. On the other hand, in a case where "type" is not a fixed character string (step S106: No), the update unit 161 makes a transition to step S108.

The update unit 161 determines whether or not a combination of "name" and "value" equal to those of the call pattern exists in the benchmark operation table 150 (step S107). In a case where no combination of "name" and "value" equal to those of the call pattern exists in the benchmark operation table 150 (step S107: No), the update unit 161 makes a transition to step S112. On the other hand, in a case where a combination of "name" and "value" equal to those of the call pattern exists in the benchmark operation table 150 (step S107: Yes), the update unit 161 makes a transition to step S108.

The update unit 161 determines whether or not "type" is a numerical value (step S108). In a case where "type" is a numerical value (step S108: Yes), the update unit 161 makes a transition to step S110. On the other hand, in a case where "type" is not a numerical value (step S108: No), the update unit 161 makes a transition to step S109.

The update unit 161 determines whether or not all parameters are examined (step S109). In a case where all the parameters are examined (step S109: Yes), the update unit 161 makes a transition to step S113. On the other hand, in a case where all the parameters are not examined (step S109: No), the update unit 161 makes a transition to step S105.

Regarding "value" of a corresponding one of the parameters, the update unit 161 performs clustering on values of the call pattern and the benchmark operation table 150 (step S110). The update unit 161 determines whether or not a value close to "value" of the call pattern exists within the benchmark operation table 150 (step S111).

In a case where a value close to "value" of the call pattern exists within the benchmark operation table 150 (step S111: Yes), the update unit 161 makes a transition to step S109. In a case where no value close to "value" of the call pattern exists within the benchmark operation table 150 (step S111: No), the update unit 161 makes a transition to step S112.

The update unit 161 newly adds, to the benchmark operation table 150, "API method" and "individual parameters" of the call pattern (step S112) and makes a transition to step S113.

The update unit 161 determines whether or not all call parameters are examined (step S113). In a case where all the call parameters are not examined (step S113: No), the examined update unit 161 makes a transition to step S102.

On the other hand, in a case where all the call parameters are examined (step S113: Yes), the update unit 161 makes a transition to step S114. The update unit 161 deletes, from the benchmark operation table 150, a record coincident with none of "API methods" and "parameters" of the API call pattern table 250 (step S114).

Figure 16:
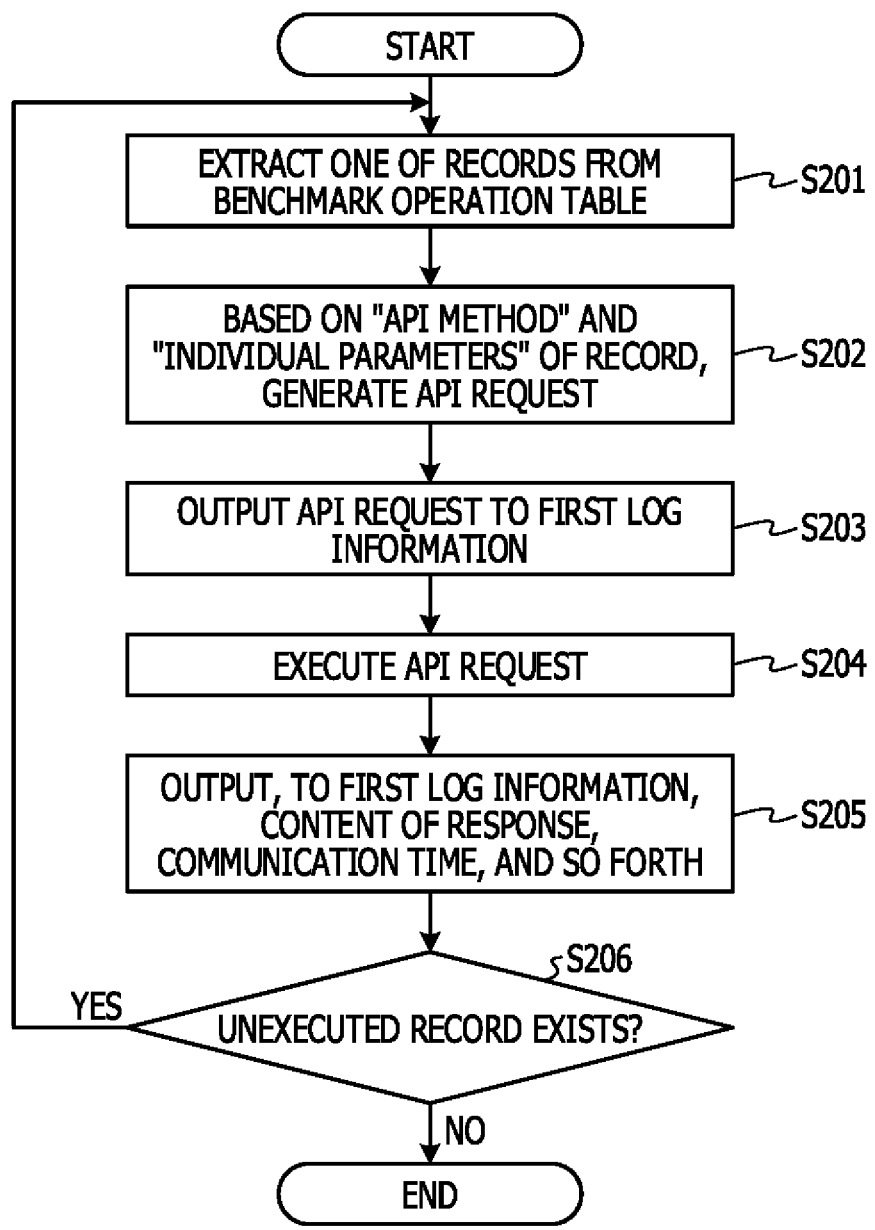
FIG. 16 is a flowchart illustrating a processing procedure by which the benchmark transmits an API request.

Next, a processing procedure by which the benchmark 160 transmits an API request will be described. FIG. 16 is a flowchart illustrating a processing procedure by which the benchmark transmits an API request. As illustrated in FIG. 16, the API request transmission unit 162 in the benchmark 160 extracts one of records from the benchmark operation table 150 (step S201).

Based on "API method" and "individual parameters" of the record, the API request transmission unit 162 generates an API request (step S202). The first log information generation unit 163 in the benchmark 160 outputs, to the first log information, information of the generated API request (step S203).

The API request transmission unit 162 executes the API request (step S204). The first log information generation unit 163 outputs, to the first log information, a content of a response from a corresponding one of the services 210, a communication time, and so forth (step S205).

The API request transmission unit 162 determines whether or not an unexecuted record exists (step S206). In a case where an unexecuted record exists (step S206: Yes), the API request transmission unit 162 makes a transition to step S201. In a case where no unexecuted record exists (step S206: No), the API request transmission unit 162 terminates the processing.

Figure 17:
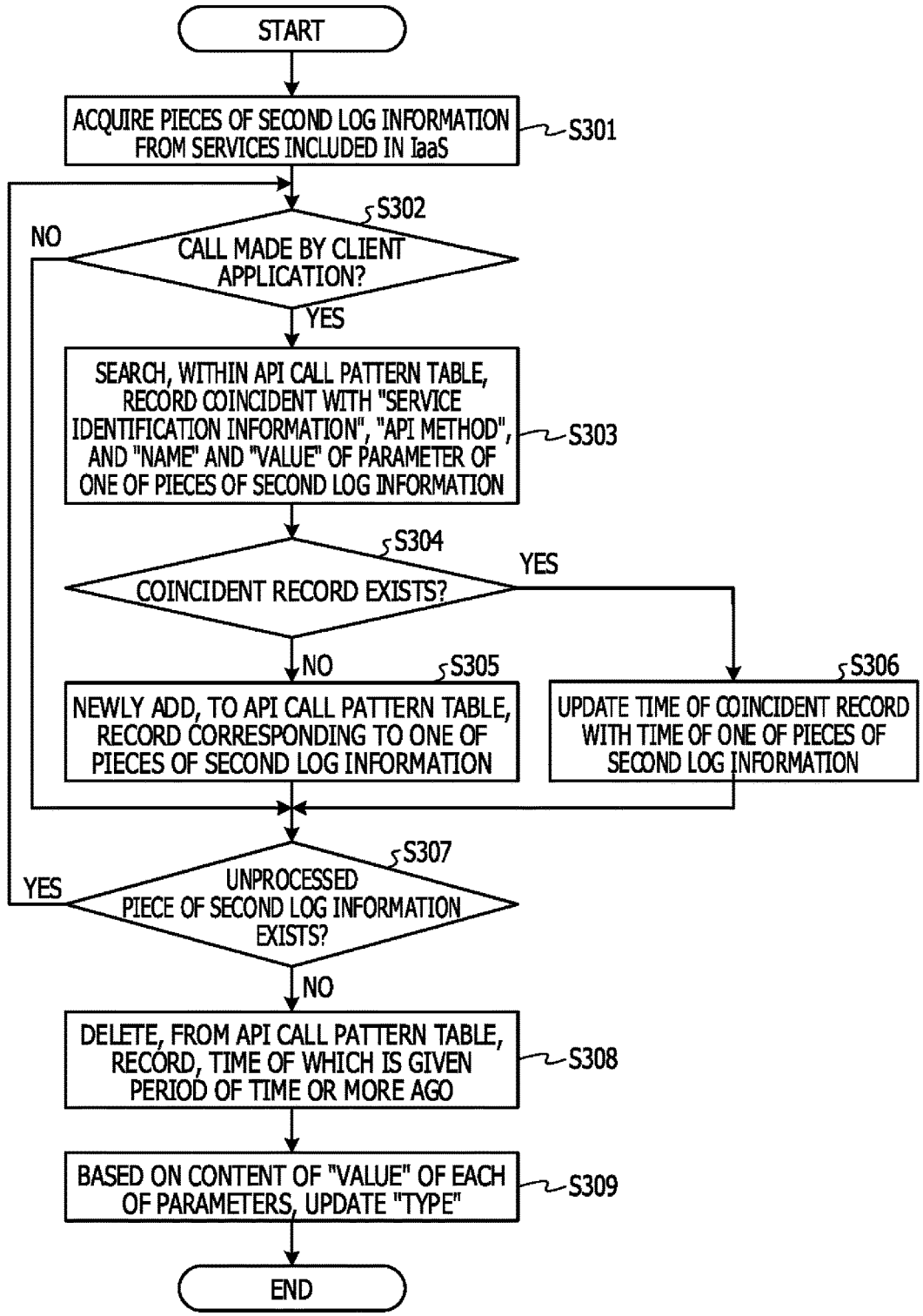
FIG. 17 is a flowchart illustrating a processing procedure by which the log collection function unit updates the API call pattern table.

Next, a processing procedure by which the log collection function unit 270 updates the API call pattern table 250 will be described. FIG. 17 is a flowchart illustrating a processing procedure by which the log collection function unit updates the API call pattern table. As illustrated in FIG. 17, the second log information acquisition unit 273 in the log collection function unit 270 acquires the pieces of second log information from the services 210 included in the IaaS 200 (step S301).

The API call pattern table update unit 274 in the log collection function unit 270 determines whether or not one of the pieces of second log information is a call made by the client application 110 (step S302). In a case where the one of the pieces of second log information is not a call made by the client application 110 (step S302: No), the API call pattern table update unit 274 makes a transition to step S307.

In a case where the one of the pieces of second log information is a call made by the client application 110 (step S302: Yes), the API call pattern table update unit 274 makes a transition to step S303. The API call pattern table update unit 274 searches, within the API call pattern table 250, a record coincident with "service identification information", "API method", and "name" and "value" of a parameter of the one of the pieces of second log information (step S303).

The API call pattern table update unit 274 determines whether or not a coincident record exists (step S304). In a case where no coincident record exists (step S304: No), the API call pattern table update unit 274 newly adds, to the API call pattern table 250, a record corresponding to the one of the pieces of second log information (step S305) and makes a transition to step S307.

In a case where a coincident record exists (step S304: Yes), the API call pattern table update unit 274 updates a time of the coincident record with a time of the one of the pieces of second log information (step S306) and makes a transition to step S307.

The API call pattern table update unit 274 determines whether or not an unprocessed piece of second log information exists (step S307). In a case where an unprocessed piece of second log information exists (step S307: Yes), the API call pattern table update unit 274 makes a transition to step S302.

On the other hand, in a case where no unprocessed piece of second log information exists (step S307: No), the API call pattern table update unit 274 deletes, from the API call pattern table 250, a record the time of which is a given period of time or more ago (step S308). Based on a content of "value" of each of parameters, the API call pattern table update unit 274 updates "type" thereof (step S309).

Figure 18:
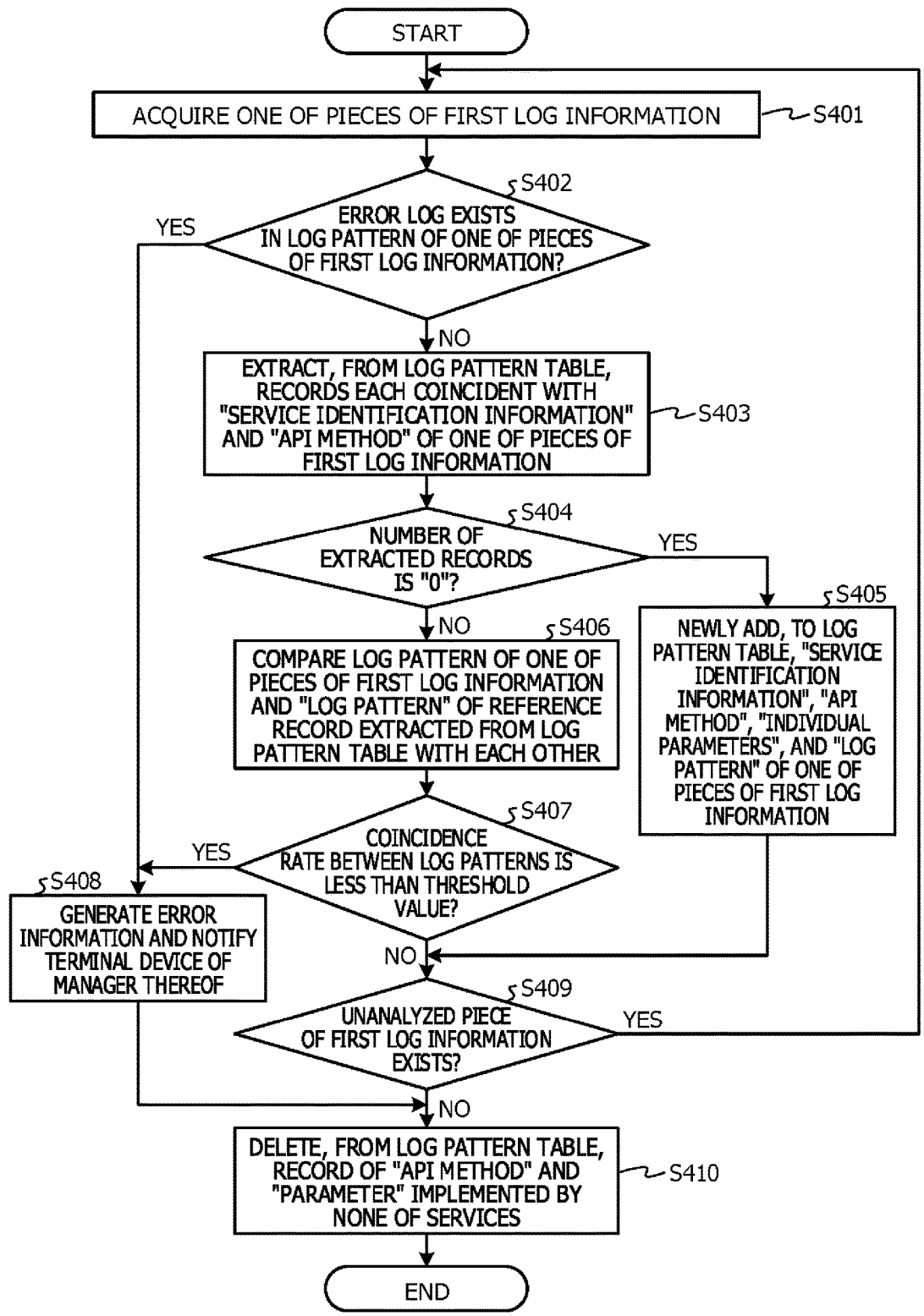
FIG. 18 is a flowchart illustrating a processing procedure by which the log collection function unit evaluates the benchmark.

Next, a processing procedure by which the log collection function unit 270 evaluates, based on the log pattern table 260, the benchmark 160 will be described. FIG. 18 is a flowchart illustrating a processing procedure by which the log collection function unit evaluates the benchmark. As illustrated in FIG. 18, the first log information acquisition unit 271 in the log collection function unit 270 acquires one of the pieces of first log information (step S401).

The evaluation unit 275 in the log collection function unit 270 determines whether or not an error log exists in a log pattern of the one of the pieces of first log information (step S402). In a case where an error log exists in the log pattern of the one of the pieces of first log information (step S402: Yes), the evaluation unit 275 makes a transition to step S408.

On the other hand, in a case where no error log exists in the log pattern of the one of the pieces of first log information (step S402: No), the evaluation unit 275 makes a transition to step S403. The evaluation unit 275 extracts, from the log pattern table 260, records each coincident with "service identification information" and "API method" of the one of the pieces of first log information (step S403).

The evaluation unit 275 determines whether or not the number of extracted records is "0" (step S404). In a case where the number of extracted records is "0" (step S404: Yes), the evaluation unit 275 makes a transition to step S405. On the other hand, in a case where the number of extracted records is not "0" (step S404: No), the evaluation unit 275 makes a transition to step S406.

The log pattern table update unit 272 in the log collection function unit 270 newly adds, to the log pattern table 260, "service identification information", "API method", "individual parameters", and "log pattern" of the one of the pieces of first log information (step S405) and makes a transition to step S409.

The evaluation unit 275 compares the log pattern of the one of the pieces of first log information and "log pattern" of a reference record extracted from the log pattern table 260 with each other (step S406).

The evaluation unit 275 determines whether or not a coincidence rate between the log patterns is less than the threshold value (step S407). In a case where the coincidence rate between the log patterns is less than the threshold value (step S407: Yes), the evaluation unit 275 generates error information and notifies a terminal device of a manager (step S408). On the other hand, in a case where the coincidence rate between the log patterns is not less than the threshold value (step S407: No), the evaluation unit 275 makes a transition to step S409.

The evaluation unit 275 determines whether or not an unanalyzed piece of first log information exists (step S409). In a case where an unanalyzed piece of first log information exists (step S409: Yes), the evaluation unit 275 makes a transition to step S401. In a case where no unanalyzed piece of first log information exists (step S409: No), the log pattern table update unit 272 deletes, from the log pattern table 260, a record of "API method" and "parameter" implemented by none of the services 210 (step S410).

Next, advantages of the system according to the present embodiment will be described. The benchmark 160 references the benchmark operation table 150 and transmits, to one of the services 210, the same API request as an API request output to the one of the services 210 by the client application 110, thereby issuing an execution request. In addition, the benchmark 160 notifies the log collection function unit 270 of the first log information. Based on the first log information and the log pattern table 260 storing therein the previous first log information, the log collection function unit 270 evaluates the benchmark 160. By performing such processing as described above, the benchmark 160 is evaluated even without acquiring log information or performance information from the client application 110. Accordingly, it is possible to indirectly evaluate the client application 110.

In addition, even in a case where a manager of the PaaS 100 and a manager of the IaaS 200 are different from each other, the manager of the IaaS 200 installs the benchmark 160 in the IaaS 200, for example, and accordingly, it is possible for the manager of the IaaS 200 to easily detect an error caused by the PaaS 100.

The log collection function unit 270 acquires the pieces of second log information from the respective services 210, thereby updating the API call pattern table 250. The benchmark 160 references the API call pattern table 250, and upon detecting a pattern not existing in the benchmark operation table 150, the benchmark 160 registers the new pattern in the benchmark operation table 150. For this reason, even in a case of not acquiring performance information or the like from the client application 110, it becomes possible to follow a functional addition or update of the client application 110, thereby causing processing for the client application 110 to be performed by the benchmark 160.

Note that the above-mentioned PaaS 100 and IaaS 200 are realized by a control unit not illustrated. The control unit corresponds to an integrated device such as, for example, an application specific integrated circuit (ASIC) or a field programmable gate array (FPGA). In addition, the control unit corresponds to an electronic circuit such as, for example, a CPU or a micro processing unit (MPU).

The benchmark operation table 150, the API call pattern table 250, and the log pattern table 260 are stored in a storage unit not illustrated. The storage unit corresponds to a semiconductor memory element such as a random access memory (RAM), a read only memory (ROM), or a flash memory or a storage device such as a hard disk or an optical disk, for example.

By the way, separate server devices may be caused to perform processing operations corresponding to the respective PaaS 100 and IaaS 200 illustrated in FIG. 1, and a single server device may be caused to perform the processing operations corresponding to the respective PaaS 100 and IaaS 200. Furthermore, the processing operation of the PaaS 100 may be divided among server devices and be performed, and the processing operation corresponding to the IaaS 200 may be divided among server devices and be performed.

In addition, while the present embodiment is described while adopting the PaaS 100 and the IaaS 200 as examples, the present embodiment is not limited to this. Even in a case of a pair of a PaaS and a SaaS or a pair of an IaaS and a SaaS, it is possible to install, in the same way, a benchmark in an upper layer, thereby detecting an error, for example.

Figure 19:
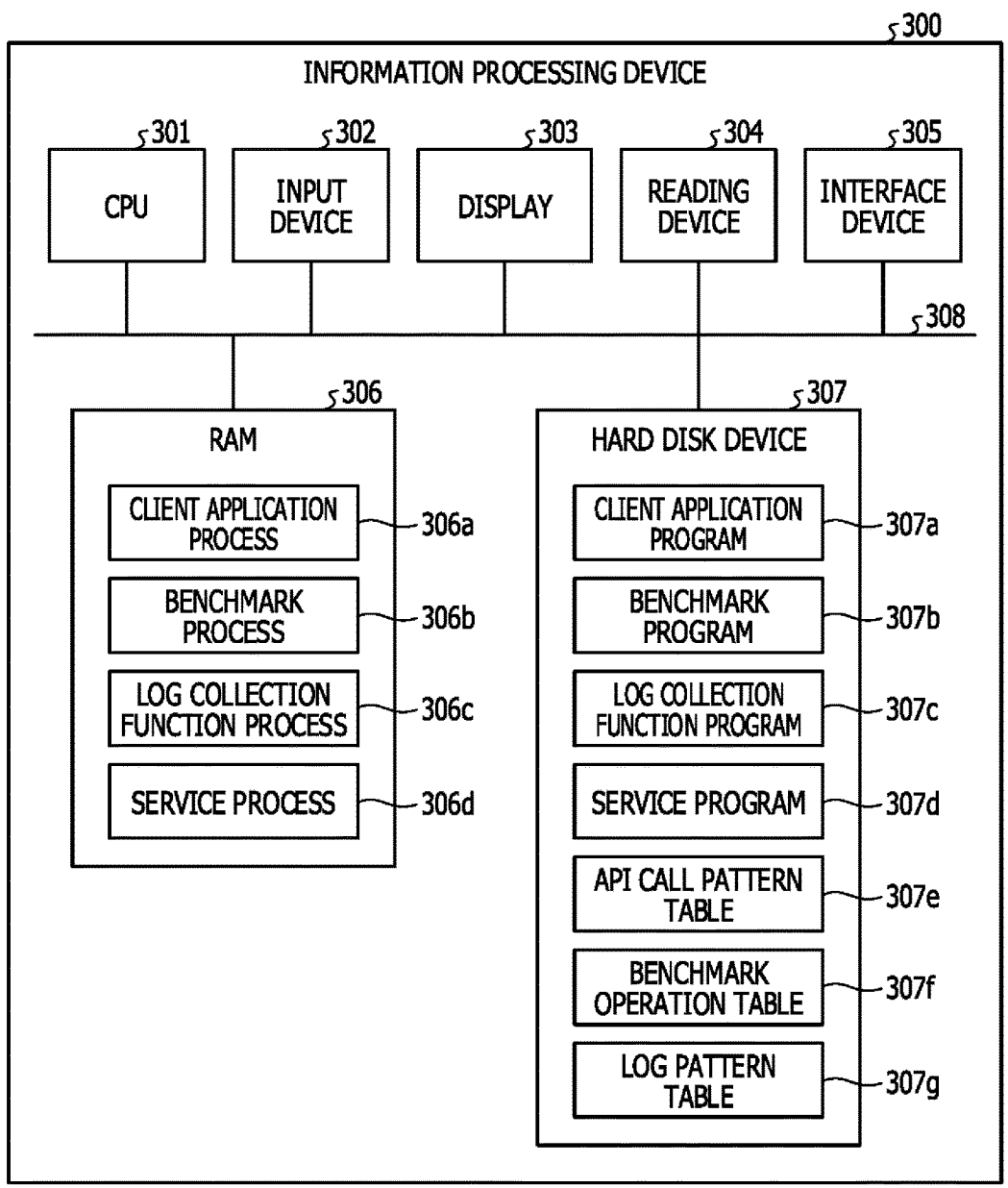
FIG. 19 is a diagram illustrating an example of a hardware configuration of an information processing device.

Next, a an example of a hardware configuration of an information processing device that executes the PaaS 100 and the IaaS 200, illustrated in the above-mentioned embodiment, will be described. FIG. 19 is a diagram illustrating an example of a hardware configuration of the information processing device.

As illustrated in FIG. 19, an information processing device 300 includes a CPU 301 to perform various types of arithmetic processing, an input device 302 to receive inputting of data from a user, and a display 303. In addition, the information processing device 300 further includes a reading device 304 to read a program and so forth from a storage medium and an interface device 305 to perform transmitting and receiving of data to and from another computer via a network. In addition, the information processing device 300 further includes a RAM 306 to temporarily store therein various kinds of information and a hard disk device 307. In addition, the individual devices 301 to 307 are coupled to a bus 308.

The hard disk device 307 includes a client application program 307a, a benchmark program 307b, a log collection function program 307c, and a service program 307d. In addition, the hard disk device 307 further includes an API call pattern table 307e, a benchmark operation table 307f, and a log pattern table 307g.

The API call pattern table 307e corresponds to the API call pattern table 250 illustrated in FIG. 1. The benchmark operation table 307f corresponds to the benchmark operation table 150 illustrated in FIG. 1. The log pattern table 307g corresponds to the log pattern table 260 illustrated in FIG. 1.

In addition, the CPU 301 reads and deploys the individual programs 307a to 307d in the RAM 306. The client application program 307a functions as a client application process 306a. The benchmark program 307b functions as a benchmark process 306b. The log collection function program 307c functions as a log collection function process 306c. The service program 307d functions as a service process 306d.

Processing performed by the client application process 306a corresponds to the processing performed by the client application 110, for example. Processing performed by the benchmark process 306b corresponds to the processing performed by the benchmark 160. The log collection function process 306c corresponds to the processing performed by the log collection function unit 270. The service process 306d corresponds to the service 210a to 210c.

Note that the individual programs 307a to 307d do not have to be stored in the hard disk device 307 from the beginning. The individual programs are stored in a "portable physical medium" such as, for example, a flexible disk (FD), a CD-ROM, a DVD disk, a magneto-optical disk, and an IC card, which are to be inserted into the information processing device 300. In addition, the information processing device 300 may read the individual programs 307a to 307d from these, thereby executing the individual programs 307a to 307d.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An evaluation method executed by a computer, the evaluation method comprising:

detecting a first execution request issued by a first software, the first execution request including first information and a first execution condition, the first information indicating a second software, the first execution condition including one or more of parameters to be used by the second software;

executing the second software in accordance with the first execution request;

storing, in a memory, the first execution condition in association with the second software indicated by the first information;

causing a third software different from the first software to issue a second execution request, the second execution request including second information and a second execution condition, the second information indicating the second software indicated by the first information, the second execution condition including the one or more of parameters included in the first execution condition;

acquiring log information regarding an execution of the second software when the second software is executed in accordance with the second execution condition included in the second execution request, the log information including a first part and a second part, the first part of the log information being acquired from the third software, the second part of the log information being acquired from the second software;

performing an evaluation regarding the third software, based on the acquired log information regarding the execution of the second software acquired in response to the second execution request; and outputting a result of the evaluation, wherein the storing further stores the first execution condition when the first execution condition is not previously stored in the memory in association with the second software.

2. An evaluation device comprising: a memory; and a processor coupled to the memory and the processor configured to:

detect a first execution request issued by a first software, the first execution request including first information and a first execution condition, the first information indicating a second software, the first execution condition including one or more of parameters to be used by the second software, execute the second software in accordance with the first execution request, store, in the memory, the first execution condition in association with the second software indicated by the first information, cause a third software different from the first software to issue a second execution request, the second execution request including second information and a second execution condition, the second information indicating the second software indicated by the first information, the second execution condition including the one or more of parameters included in the first execution condition, acquire log information regarding an execution of the second software when the second software is executed in accordance with the second execution condition included in the second execution request, the log information including a first part and a second part, the first part of the log information being acquired from the third software, the second part of the log information being acquired from the second software;

perform an evaluation regarding the third software, based on the acquired log information regarding the execution of the second software acquired in response to the second execution request; and output a result of the evaluation, wherein the processor is configured to store the first execution condition further storing when the first execution condition is not previously stored in the memory in association with the second software.

3. A non-transitory computer-readable storage medium storing an evaluation program that causes a computer to execute a process, the process comprising:

detecting a first execution request issued by a first software, the first execution request including first information and a first execution condition, the first information indicating a second software, the first execution condition including one or more of parameters to be used by the second software;

executing the second software in accordance with the first execution request;

storing, in a memory, the first execution condition in association with the second software indicated by the first information;

causing a third software different from the first software to issue a second execution request, the second execution request including second information and a second execution condition, the second information indicating the second software indicated by the first information, the second execution condition including the one or more of parameters included in the first execution condition;

acquiring log information regarding an execution of the second software when the second software is executed in accordance with the second execution condition included in the second execution request, the log information including a first part and a second part, the first part of the log information being acquired from the third software, the second part of the log information being acquired from the second software;

performing an evaluation regarding the third software, based on the acquired log information regarding the execution of the second software acquired in response to the second execution request; and outputting a result of the evaluation, wherein the storing further stores the first execution condition when the first execution condition is not previously stored in the memory in association with the second software.

4. The non-transitory computer-readable storage medium according to claim 1, wherein the first software and the second software are included in layer structure of pieces of software, the first software and the second software are included in different layers, in the layer structure, from each other.

* * * * *